US011412073B2

(12) United States Patent
Jankly et al.

(10) Patent No.: US 11,412,073 B2
(45) Date of Patent: Aug. 9, 2022

(54) ALTERNATE CONTROL CHANNEL FOR NETWORK PROTOCOL STACK

(71) Applicant: Raytheon Company, Waltham, MA (US)

(72) Inventors: Steve P. Jankly, Pasadena, CA (US); Neil R. Epstein, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 78 days.

(21) Appl. No.: 16/654,940

(22) Filed: Oct. 16, 2019

(65) Prior Publication Data

US 2021/0120108 A1 Apr. 22, 2021

(51) Int. Cl.
*H04L 69/22* (2022.01)
*H04L 69/16* (2022.01)

(52) U.S. Cl.
CPC ............ *H04L 69/22* (2013.01); *H04L 69/161* (2013.01)

(58) Field of Classification Search
CPC ..... H04L 67/40; H04L 69/161; H04L 69/164; H04L 69/22; H04L 67/1097; G06F 13/28; G06F 16/10
See application file for complete search history.

(56) References Cited

U.S. PATENT DOCUMENTS

| 7,464,174 | B1 | 12/2008 | Ngai |
| 8,498,206 | B2 | 7/2013 | Mraz |
| 8,560,646 | B1 | 10/2013 | Marshall et al. |
| 10,942,888 | B2 | 3/2021 | Epstein et al. |
| 2005/0240932 | A1* | 10/2005 | Billau ................... G06F 9/5072 718/104 |
| 2009/0094353 | A1* | 4/2009 | Isobe .................... G06F 15/177 709/221 |

(Continued)

FOREIGN PATENT DOCUMENTS

| CA | 2753747 A1 * | 6/2012 | ......... H04L 67/1002 |
| EP | 1307028 A2 | 5/2003 | |

(Continued)

OTHER PUBLICATIONS

U.S. Appl. No. 16/364,920, filed Mar. 26, 2019, Data Transferring Without a Network Interface Configuration.

(Continued)

*Primary Examiner* — Rina C Pancholi
(74) *Attorney, Agent, or Firm* — Schwegman Lundberg & Woessner, P.A.

(57) ABSTRACT

Methods, systems, and computer-readable mediums for an alternate control channel for a network protocol stack are disclosed. In some embodiments a controller device provides instructions to one or more source devices via a shared memory. The controller device instructs the one or more source devices to override network parameters associated with network communication performed by the source devices. The network parameters to be overridden may include transport level source ports, source network addresses, or source link level addresses. In some embodiments, a range of override values are specified. In some of these aspects, a source device may perform time division multiplexing via the multiple override values, such that data generated by a single device may appear to be transmitted by multiple devices.

20 Claims, 11 Drawing Sheets

(56) References Cited

U.S. PATENT DOCUMENTS

| | | |
|---|---|---|
| 2009/0248896 A1 | 10/2009 | Cohn |
| 2010/0048205 A1 | 2/2010 | Guilford et al. |
| 2014/0052808 A1 | 2/2014 | Krishnan et al. |
| 2014/0269487 A1 | 9/2014 | Kalkunte |
| 2015/0156289 A1 | 6/2015 | Pandit et al. |
| 2016/0112370 A1 | 4/2016 | Theogaraj et al. |
| 2016/0323164 A1 | 11/2016 | Cao |
| 2017/0012977 A1 | 1/2017 | Li et al. |
| 2017/0155717 A1 | 6/2017 | Tamir et al. |
| 2017/0171075 A1 | 6/2017 | Sajeepa et al. |
| 2017/0003391 A1 | 11/2017 | Lee |
| 2019/0171612 A1 | 6/2019 | Shahar et al. |
| 2020/0311014 A1 | 10/2020 | Epstein et al. |
| 2021/0119963 A1 | 4/2021 | Jankly et al. |

FOREIGN PATENT DOCUMENTS

| | | | |
|---|---|---|---|
| WO | WO-03036465 A2 * | 5/2003 | ............. G06F 9/544 |
| WO | WO-03036465 A2 | 5/2003 | |
| WO | WO-2020198308 A1 | 10/2020 | |
| WO | WO-2021076213 A1 | 4/2021 | |
| WO | WO-2021247693 A1 | 12/2021 | |

OTHER PUBLICATIONS

U.S. Appl. No. 16/891,949, filed Jun. 3, 2020, Alternate Control Channel for Network Protocol Stack.

"U.S. Appl. No. 16/364,920, Non Final Office Action dated May 14, 2020", 22 pgs.

"U.S. Appl. No. 16/364,920, Notice of Allowance dated Oct. 29, 2020", 7 pgs.

"U.S. Appl. No. 16/364,920, Response filed Jul. 23, 2020 to Non Final Office Action dated May 14, 2020", 16 pgs.

"International Application Serial No. PCT/US2020/024626, International Search Report dated Jun. 17, 2020", 3 pgs.

"International Application Serial No. PCT/US2020/024626, Written Opinion dated Jun. 17, 2020", 7 pgs.

"International Application Serial No. PCT/US2020/046485, International Search Report dated Oct. 13, 2020", 4 pgs.

"International Application Serial No. PCT/US2020/046485, Written Opinion dated Oct. 13, 2020", 6 pgs.

"U.S. Appl. No. 16/891,949, Response filed Sep. 9, 2021 to Non Final Office Action dated Jun. 10, 2021", 12 pgs.

"International Application Serial No. PCT/US2020/024626, International Preliminary Report on Patentability dated Oct. 7, 2021", 6 pgs.

"U.S. Appl. No. 16/364,920, 312 Amendment filed Jan. 27, 2021", 7 pgs.

"U.S. Appl. No. 16/891,949, PTO Response to Rule 312 Communication dated Feb. 5, 2021", 2 pgs.

"U.S. Appl. No. 16/891,949, Non Final Office Action dated Jun. 10, 2021", 38 pgs.

"International Application Serial No. PCT/US2021/035434, International Search Report dated Aug. 4, 2021", 4 pgs.

"International Application Serial No. PCT/US2021/035434, Written Opinion dated Aug. 4, 2021", 7 pgs.

"U.S. Appl. No. 16/891,949, Advisory Action dated Mar. 10, 2022", 3 pgs.

"U.S. Appl. No. 16/891,949, Final Office Action dated Dec. 15, 2021", 29 pgs.

"U.S. Appl. No. 16/891,949, Response filed Feb. 15, 2022 to Final Office Action dated Dec. 15, 2021", 10 pgs.

"International Application Serial No. PCT/US2020/046485, International Preliminary Report on Patentability dated Apr. 28, 2022", 8 pgs.

* cited by examiner

US 11,412,073 B2

ALTERNATE CONTROL CHANNEL FOR NETWORK PROTOCOL STACK

TECHNICAL FIELD

Embodiments disclosed herein relate to network communications. Some embodiments relate to data transfer between nodes of a network.

BACKGROUND

Many modern requirements of electronic systems require those systems to consume fewer and fewer resources. Systems designed under these requirements may be referred to as constrained by Size, Weight and Power (SWaP). Because these devices are designed under these constraints, they may not include many of the hardware and/or software capabilities common in a modern computing environment having more resources available. This lack of resources can create challenges in accomplishing many important functions, such as keeping track of peripheral nodes that lack a fully implemented network stack, challenges streaming data from a peripheral device, such as a sensor, which may lack proper network interface definitions to communicate with target nodes within a network. Many SWaP constrained systems also include limited space for hardware components, making implementations of these capabilities that much more challenging.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

Figure 1:
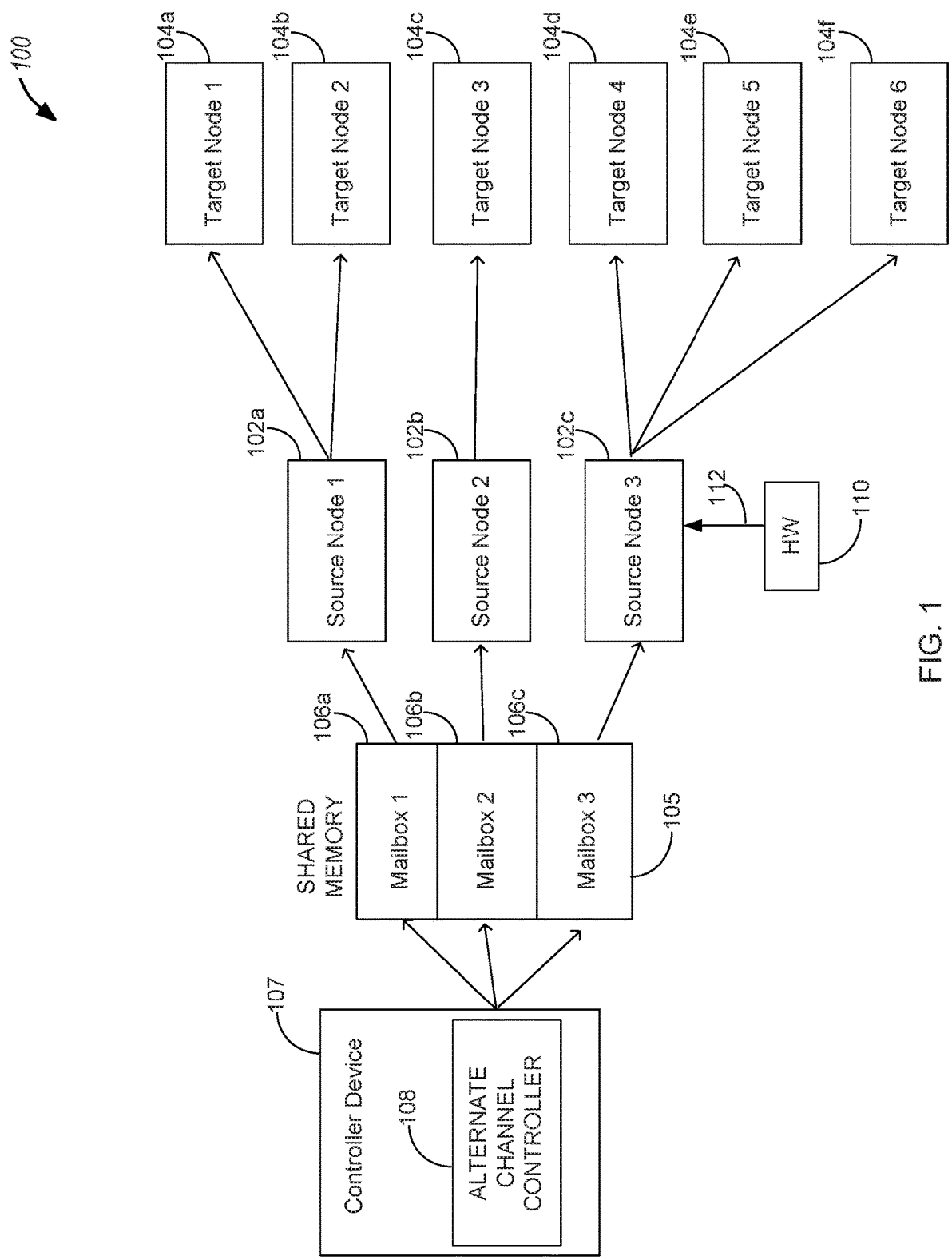
FIG. 1 is an overview diagram of a system implementing one or more of the disclosed embodiments.

The following detailed description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

DETAILED DESCRIPTION

Disclosed are embodiments for implementation of an alternative control channel for a network protocol stack. In some embodiments, the network protocol stack may be implemented in a SWaP constrained device. Thus, the network protocol stack may be under various hardware-based constraints with respect to memory, processor size and/or speed, and/or power available. These hardware constraints may give rise to software-based constraints as well. For example, given limited memory and/or processor resources, some of the disclosed devices may lack software that would otherwise provide network capabilities available in more fully featured implementations.

The disclosed embodiments provide for control inputs to be provided to one or more source devices. The source devices may be SWaP constrained devices in some aspects. The control inputs may be provided via a shared memory that is accessible to each of the source devices. From the shared memory, each of the source devices reads configuration information that defines the one or more control inputs. The control inputs may alter one or more network protocol stack control parameters the source device is utilizing to communicate on a network. The parameters may control one or more "layers" in the network protocol stack. For example, the parameters may control a transport, network, or link layer of the network protocol stack. In some aspects, the parameters may include source port identification (e.g. a UDP source port), source network address information (e.g. an Internet Protocol address), or source link address information (e.g. station address). However, the disclosed embodiments are not limited to these examples.

The one or more source devices are controlled via a controller, that communicates to the source nodes via the shared memory. In some aspects, each of the source nodes may be allocated a portion of the shared memory which is used for communication between the controller and the source device. For example, in some aspects, each source node may be allocated a portion of the shared memory that include a message pointer and a message waiting indicator. The controller may set the message waiting indicator while the source node may clear the message waiting indicator upon consuming a message from the shared memory mailbox.

The controller may, in some embodiments, display a user interface that provides user interface controls allowing for control of the source devices. In some aspects, the controller may read configuration information for one or more of the source devices from a configuration file. The configuration file may be manually edited via a text editor in some embodiments. In some other embodiments, the configuration file may be programmatically modified, either automatically via another control program or via a configuration user interface. The details of the solution will become more apparent in the discussion below.

FIG. 1 is an overview diagram of a system 100 implementing one or more of the disclosed embodiments. FIG. 1 shows three source nodes or devices 102a-c. The three source devices 102a-c are communicating with six target nodes or devices 104a-f. Source device 102a is sending data to target devices 104*a* and 104*b*. Source device 102*b* is sending data to target device 104*c*. Source device 102*c* is sending data to target device 104*d-f*. Each of the source devices 102*a-c* are reading control information from a shared memory 105. The shared memory 105 is divided into at least three mailboxes 106*a-c*. Each of the mailboxes 106*a-c* is allocated for communication with one of the source devices 102*a-c* respectively.

FIG. 1 also shows a controller device 107. The controller device 107 runs a software or firmware module alternate channel controller 108. The alternate channel controller 108 also has access to the shared memory 105. The alternate channel controller 108 is configured to send instructions, such as network configuration parameters, to each of the source devices 102*a-c* via its respective mailbox 106*a-c* respectively.

FIG. 1 also shows external hardware 110. External hardware 110 may comprise a field programmable gate array (FPGA) or other hardware capable of generating interrupt or discrete signals via connection 112. As discussed further below, some embodiments are configured to receive discrete signals from external hardware 110 to trigger switching of overwrite values as discussed further below.

Figure 2:
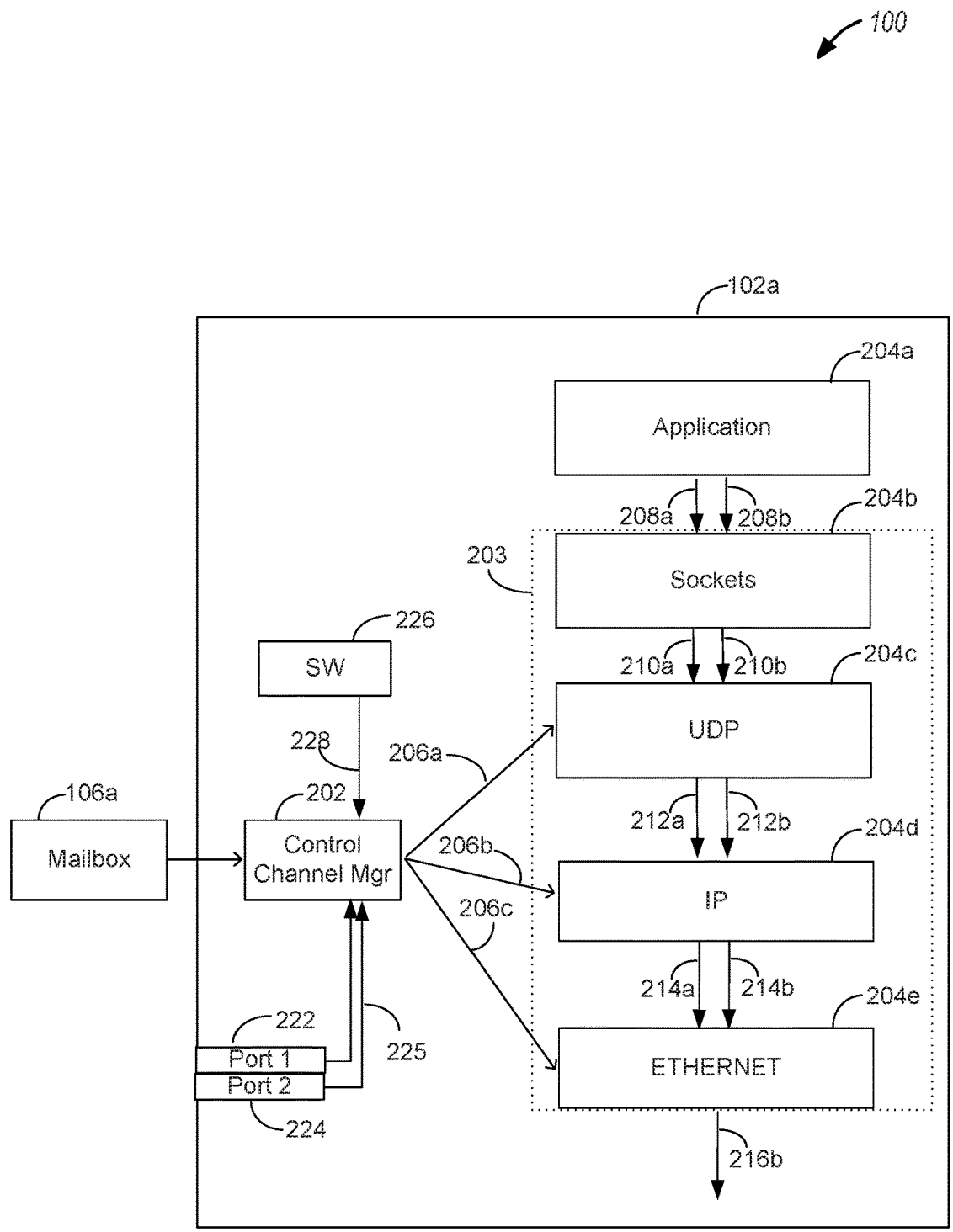
FIG. 2 shows an example implementation of a source device, such as any of the source devices discussed above with respect to FIG. 1.

FIG. 2 shows an example implementation of a source device, such as any of the source devices 102*a-c* discussed above with respect to FIG. 1. The example source device 102 includes a control channel manager 202. The control channel manager 202 may represent a set or group of instructions that configure hardware processing circuitry to perform one or more of the functions discussed below and attributed to the control channel manager 202.

The control channel manager 202 of the source device 102 reads configuration information from the shared memory 105, discussed above with respect to FIG. 1. The control information indicates alternative control information for a network protocol stack 203 included in the source device 102. To facilitate control of the network protocol stack 203 via the shared memory 105, the example source device 102 shown in FIG. 2 includes data communication channels 206*a-c* between the control channel manager 202 and various components of the network protocol stack 203 included in the source device 102. The example network protocol stack 203 includes a sockets layer 204*b*, transport layer 204*c* (shown as implanting a user datagram protocol (UDP) protocol), a network layer 204*d* (shown as implementing Internet Protocol (IP), and a link layer 204*e* (shown as implementing an Ethernet protocol, but other link protocols, such as Fiber Channel are also contemplated).

Above the sockets layer 204*b* of the network protocol stack 203 is a network application 204*a*. The network application 204*a* invokes control and data methods 208*a-b* respectively of the sockets layer 204*b* to generate network communication by the example source device 102. While FIG. 2 shows an example protocol stack 203 that includes the sockets layer 204*b*, UDP protocol 204*c*, IP protocol 204*d*, and a link layer 204*e*, one of skill in the art would understand that this is just one example of a network protocol stack and the disclosed embodiments are not limited to this example.

FIG. 2 shows the network application 204*a* invoking control and data methods 208*a-b* respectively of the sockets layer 204*b*. The control methods 208*a* may modify one or more control parameters of one or more of the layers below the sockets layer 204*b*. For example, the control methods 208*a* may function to allow the application 204*a* to specify a source and/or destination port for use by the transport layer 204*c* (e.g. UDP protocol). A specified source and/or destination port overwrites a second source and/or destination port that may have been provided by the application 204*a*.

The control methods 208*a* may further specify a source and/or destination network address (e.g. such as a source IP address (IPv4 or IPv6) and/or a source and/or destination link level address, such as a source Ethernet address. In some implementations of the network protocol stack 203, each interface between a layer N and a layer N+1 includes both control and data methods. These are shown in FIG. 2 as control and data methods 210*a-b*, 212*a-b*, and 214*a-b*, which provide for the control of parameters between each of the sockets layer 204*b* and transport layer 204*c*, transport layer 204*c* and network layer 204*d*, and network layer 204*d* and link layer 204*e* respectively. FIG. 2 also shows a data path 216*b* which represents a data output of the link layer 204*e*.

As discussed above, in various embodiments, one or more communication channels between the control channel manager 202 and a component of the network protocol stack 203 may be provided. These control channels allow the control channel manager 203 to override/overwrite at least some of the control parameters that may have been provided by the network application 204*a* via the control methods, such as control method 208*a*. Thus, while the network application 204*a* may specify a source service access point (SAP) value of, for example, 123, the control channel manager 202 may specify a source SAP value of 321. In this case, the transportation protocol 204*c* utilizes the input provided by the control channel manager 202 and essentially ignores or overwrites the input provided by the network application 204*a*.

In some embodiments, the control channel manager 202 may read alternative station address information from the mailbox 106*a*. The station address information may define a link level station address to be applied by the Ethernet layer 204*e* as a source station address when sending data generated by the application 204*a*. The defined link level station address may override a station address provided in hardware of the source device 102. For example, the source device 102 may include a network interface that includes a station address that is provided during manufacturing of the network interface. The station address obtained from the configuration information read from the mailbox 106*a* is used to override this factory supplied station address and any other station address that may have been provided. In other words, configuration information provided via the shared memory 105 by the control channel manager 202 has the highest priority of any configuration information that may be available. Thus, if conflicts exist between multiple versions of configuration information for any portion of the network protocol stack 203, configuration information provided by the shared memory 105 takes precedence over any other configuration information.

In some embodiments, the control channel manager 202 reads alternative network address information from the shared memory mailbox 106*a*. In some embodiments, the control channel manager 202 reads alternative source SAP information from the shared memory mailbox 106*a*. The control channel manager 202 configures the UDP module 204*c* to utilize the alternative source SAP based on receiving the instructions from the shared memory 105.

FIG. 2 shows that the control channel manager 202 can receive discrete signals 225 from a hardware port, such as hardware ports 222 and/or 224. In some embodiments, the hardware 110 discussed above with respect to FIG. 1 is connected to one of the ports 222 or 224 shown in FIG. 2. In some embodiments, the discrete signals 225 received via one or more of the ports 222 or 224 function as a trigger for the control channel manager 202 to switch an overwritten value from a first value to a second value. For example, in one example embodiment, the control channel manager 202 may overwrite a source ethernet address utilized by the ethernet component 204e from a first value to a second value upon reception of a discrete signal from the port 224. Similarly, FIG. 2 shows that the control channel manager 202, in some embodiments, is configured to receive software signals 228 from software 226. For example, software 226 may generate a POSIX type signal that is received by the control channel manager 202. Upon receiving the signal from the software 226, the control channel manager is, in some embodiments, configured to switch an overwritten parameter from a first value to a second value, as discussed further below.

Figure 3:
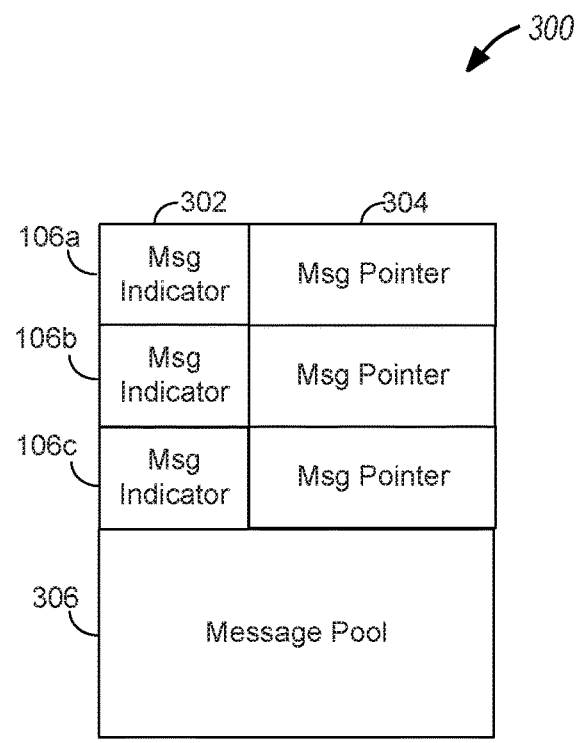
FIG. 3 shows one example of a mailbox data structure that may be implemented in one or more of the disclosed embodiments.

FIG. 3 shows one example of a mailbox data structure 300 that may be implemented in one or more of the disclosed embodiments. In some embodiments, the shared memory 105 discussed above with respect to FIG. 1 may conform with the format of the mail box data structure 300 of FIG. 3. The mailbox data structure 300 includes three mailboxes 106a-c, consistent with the description of FIG. 1 above. Each mailbox 106a-c includes a message indicator 302 and a message pointer 304. The message indicator 302 indicates whether the respective mailbox includes an unread message. In some embodiments, the mailbox indicator 304 is set by a device or module adding a message to the mailbox (e.g., alternate channel controller 108), and is cleared by a device or module consuming the message (e.g., control channel manager 202) after consuming the message.

The message pool 306 provides memory for messages. The messages may vary by embodiment, with an example message format discussed below with respect to FIG. 4. Messages in the message pool 306 may be managed according to traditional dynamic memory management techniques, at least in some aspects.

In some embodiments, a producer and/or consumer of messages passed via the mailboxes 106a-c may implement separate queuing mechanisms to facilitate buffering of messages as necessary before they are produced/consumed. For example, if the alternate channel controller 108 generates a message for communication to a source device (e.g., any source device 102a-c), but the mailbox (e.g., any of 106a-c) indicates a message is already posted to the mailbox (e.g. a previous message has not yet been consumed by the source device), then the alternate channel controller 108 may queue the first message until the mailbox becomes available. Similarly, in some aspects, a source device (e.g., implementing a control channel manager 202) may immediately remove a message from its mailbox (e.g., any of 106a-c) once it has detected the message. The message may be queued on a queue internal to the control channel manager 202 until data from the message is processed and the message is no longer needed. The message may then be returned to the message pool for reuse. By immediately removing messages upon detection, the control channel manager 202 prevents the mailbox (e.g., 106a-c) from becoming a bottleneck for communication between the alternate channel controller 108 and the control channel manager 202.

Figure 4:
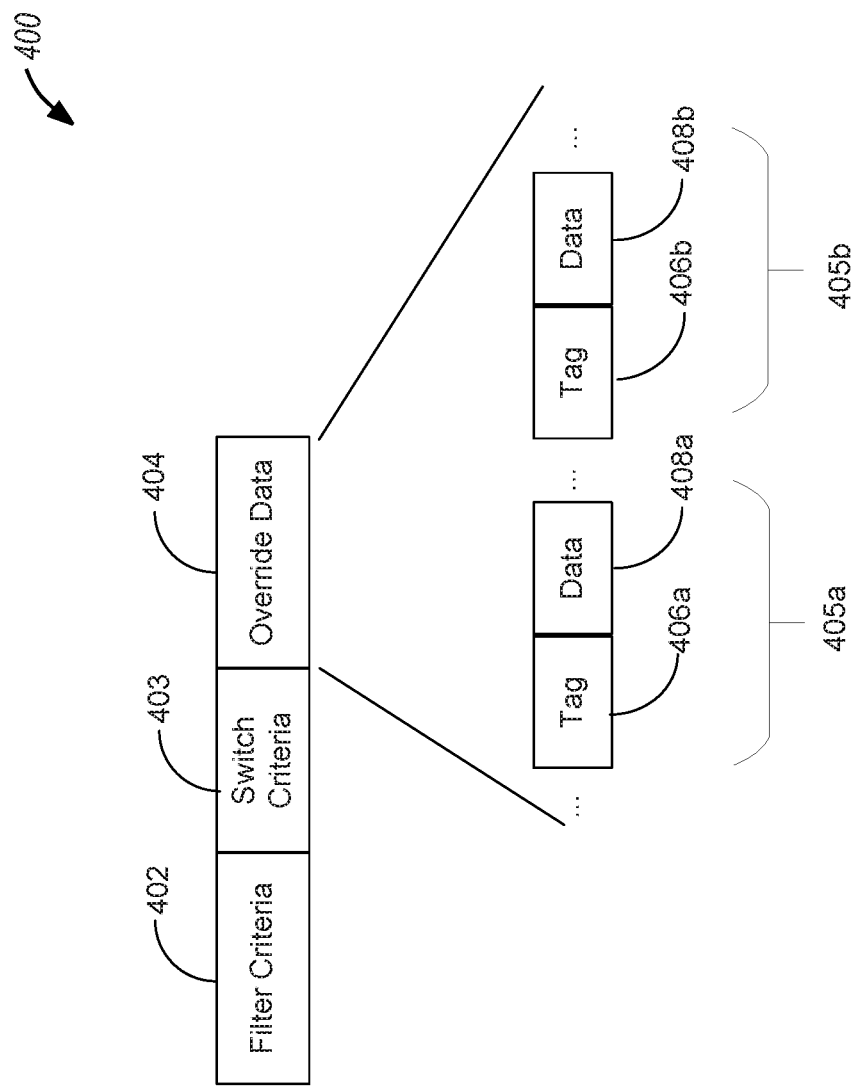
FIG. 4 shows an example message format for a message that is communicated between the alternate channel controller and the control channel manager in some of the disclosed embodiments.

FIG. 4 shows an example message format for a message that is communicated between the alternate channel controller 108 and the control channel manager 202 in some of the disclosed embodiments. The message 400 includes filter criteria field 402 and an override data field 404. The filter criteria field 402 defines one or more filter criterion to be applied to a packet. If the packet matches the filter criterion, then the override data specified by the override data field 404 is applied to the packet. If none of the one or more criterion defined by the filter criteria field 402 match the packet, the packet is allowed to pass without override data being applied. The switch criterion field 403 defines criterion for switching between overwritten values. For example, the switch criterion field 403 defines, in some embodiments, when a first SAP value is used or overwritten to a source SAP field in packets transmitted by a device and when the overwrite operation switches from the first SAP value to a second SAP value.

The override data field 404 defines one or more data that are to be written to an outbound packet by a source device (e.g., any source device 102a-c). The override data field 404 includes one or more groups of fields, shown in FIG. 4 as groups 405a and 405b. Each field group includes a tag field (e.g. 406a-b) and a data field (e.g., 408a-b). The tag may identify a type of data included in corresponding data field within a group. In some aspects, predefined numbers may be associated with data types. For example, a first predefined number may identify a source network address data type (e.g., an IP address), a second predefined number may identify a transport level source port data type (e.g., a UDP source port). A third predefined number identifies a source link level address (e.g., an Ethernet station address). Additional predefined numbers may identify ranges of these values (e.g., a source port range, network address range, or link level address range). In some aspects, each individual network parameter value within the range may be assigned or associated with a criterion for applying the individual value within the range. This criterion may also be specified in the associated data field 408.

The message 400 may provide for configuring a source device (e.g., 102a-c) to overwrite network parameters within a network stack (e.g., 205) as specified by the alternate channel controller 108.

Figure 5A:
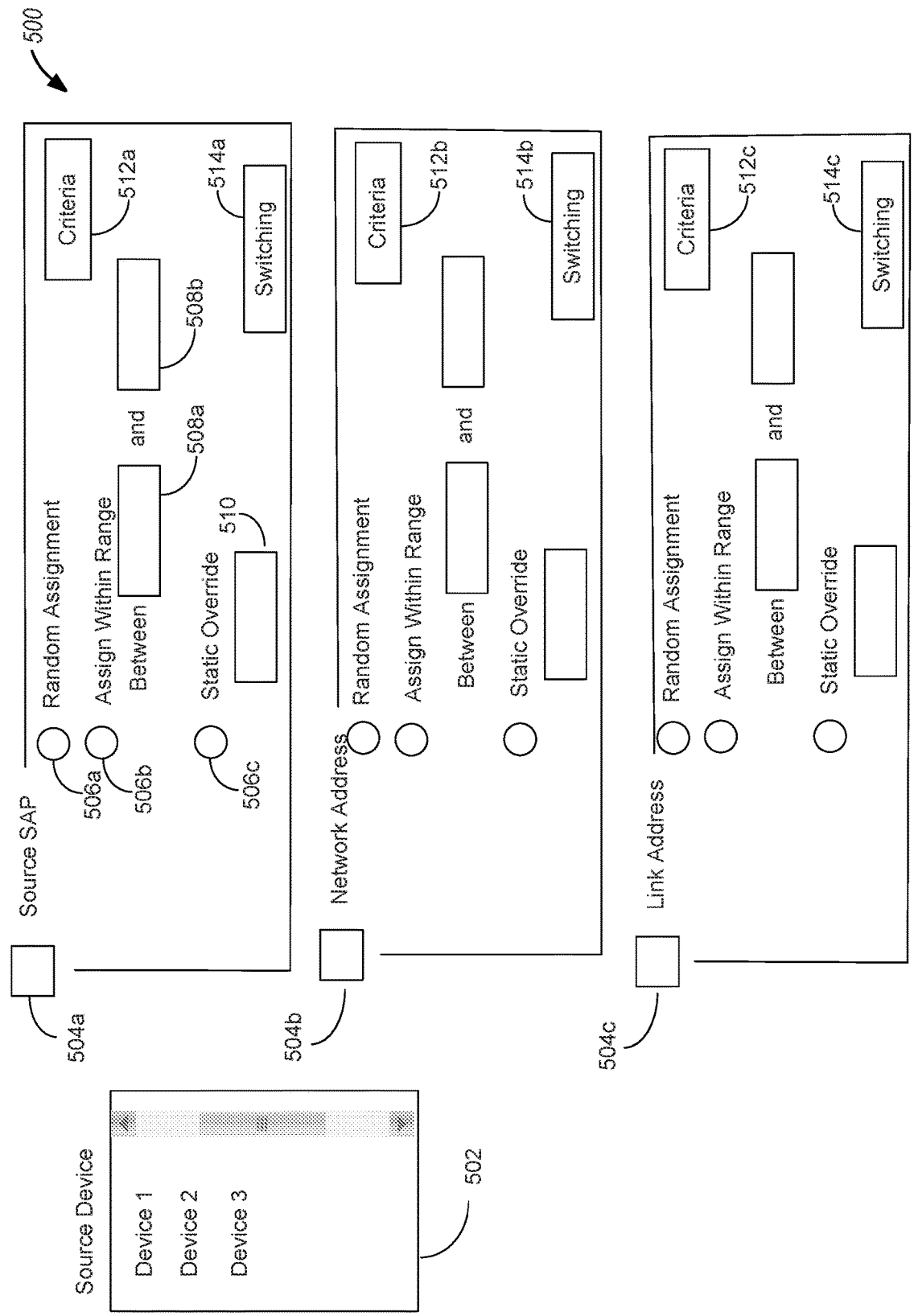
FIG. 5A shows an example user interface that may be implemented in one or more of the disclosed embodiments.

FIG. 5A shows an example user interface 500 that may be implemented in one or more of the disclosed embodiments. FIG. 5A includes a device list box 502. The device list box 502 provides for selection of a particular source device. Example devices device 1, device 2, and device 3 are listed. In some embodiments, these three devices correspond to source devices 102a-c, discussed above with respect to FIG. 1.

For a device selected in the device list box 502, the user interface 500 provides configuration parameters, set via the check boxes 504a-c. The checkbox 504a provides for setting of configuration parameters relating to a source SAP. For example, selection of the check box 504a may indicate a source transport level SAP (e.g., UDP sap) is to be overwritten by the device selected in device list box 502. When the checkbox 504a is selected, further user interface controls provide for additional specification of an overwrite of the source SAP. Radio buttons 506a-c provide for selection of random assignment of a source SAP (via 506a), a range of values from which to assign a source SAP (via 506b), or a static, single value for the source SAP (via radio button 506c). When selecting a range of values via radio button 506b, a start of the range is specified via edit field 508a and an end value of the range is specified via edit field 508b. Some embodiments may provide for selection of a source SAP from the specified range via different methods. For example, some embodiments may provide for random selection of a source sap within the range, sequential selection of a source SAP within the range, or reverse sequential selection (numerical high to numerical low value). When a static value is specified via radio button 506*c*, an edit field 510 is provided for entering a value of the static overwritten value. When checkbox 504*a* is selected, further selection of control 514*a* displays, in some embodiments, a user interface configured to accept input defining switching parameters. The switching parameters are described further below with respect to FIG. 5B. Each of the switching controls 514*a-c*, in some embodiments, are disabled when static override of parameters is chosen, for example, via radio control 506*c* and edit box 510, or via corresponding controls for each of the network address and link address overwrite parameters.

Each of the additional check boxes 504*b* and 504*c* include similar fields, so their descriptions are not repeated here. Check box 504*b* provides for overriding a source network address (e.g. Internet Protocol (IP) address) of a device highlighted or selected in the device list box 502. The check box 504*c* provides for overriding of a link level source address (e.g. source station address) of the device selected or highlighted in the device list box 502.

The UI 500 also provides for specifying one or more criterion (criteria) that must be met before the override specified by the UI 500 is put into effect. The criteria specified may refer to a time of day and/or date range, or may apply to characteristics of a particular packet to which the overwrite data is to be applied. One or more criterion for a source SAP, network address, or link address may be specified by selecting a control included on the user interface 500. An example control 512*a* is shown with respect to source sap 504*a*. Each of the network address 504*b* and/or 504*c* link address override information may also specify one or more criterion via separate controls 512*b* and 512*c* respectively. Example criteria are described below with respect to FIG. 6.

Note that while example UI 500 illustrates an ability to configure overwrite values for a single network address (e.g. via 504*b*), link address (e.g. via 504*c*, etc), and SAP (e.g. via 504*a*), other embodiments may provide for configuration of overwriting of other parameters. For example, some embodiments may provide for overwriting of one or more of source and/or destination SAPs, source and/or destination network addresses, and/or source and/or destination link level addresses.

Figure 5B:
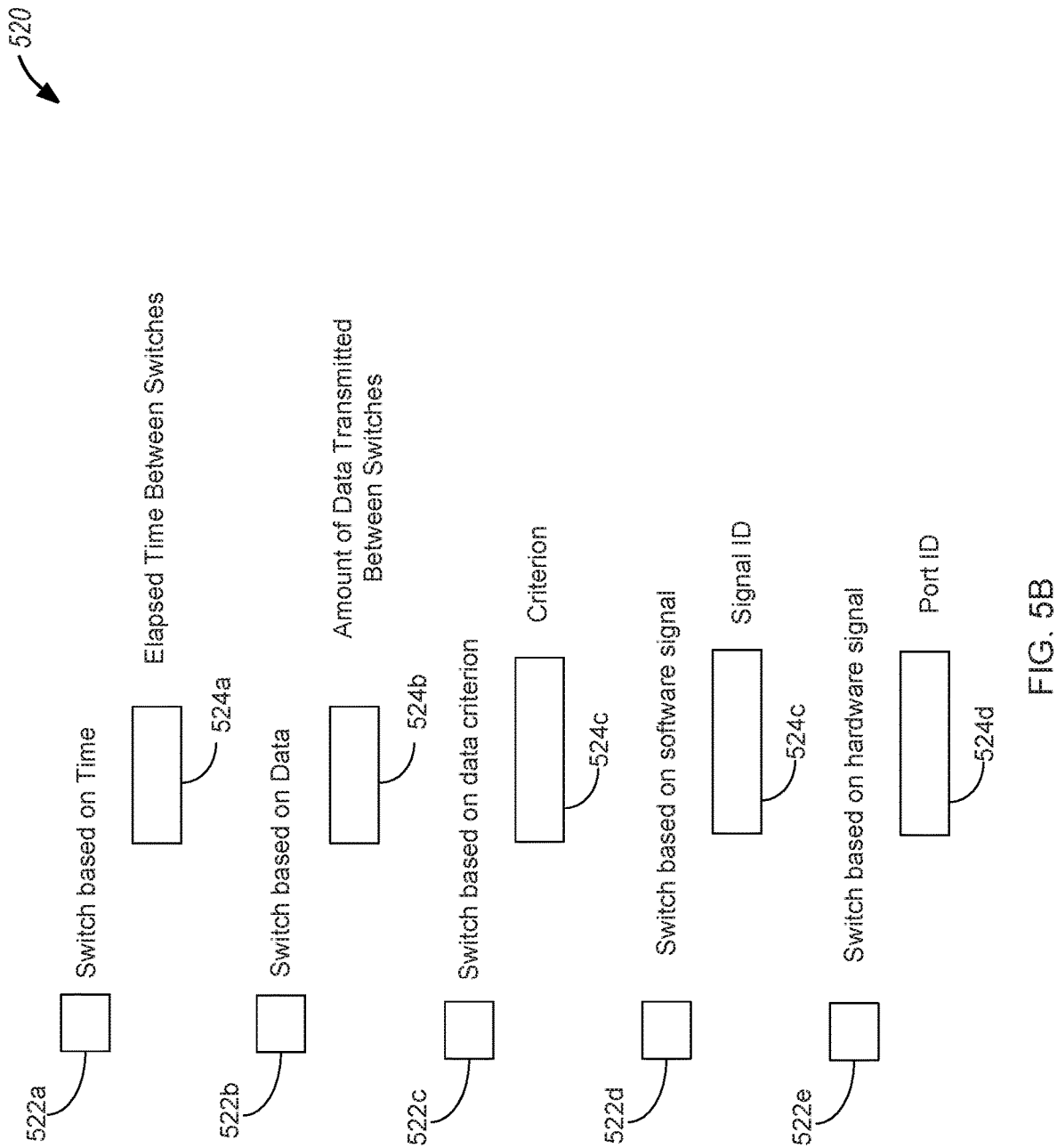
FIG. 5B shows an example user interface that may be implemented in one or more of the disclosed embodiments.

FIG. 5B shows an example user interface that is implemented in one or more of the disclosed embodiments. The user interface 520 shown in FIG. 5B is displayed, by some embodiments, upon selection of any one or more of controls 514*a-c*, discussed above with respect to FIG. 5A. The user interface 500 provides for configuration of switching parameters relating to the SAP, network, or link level override being configured via user interface 500, discussed above (e.g. via selection of one of controls 514*a-c* respectively).

User interface 520 includes five check box controls 522*a*, 522*b*, 522*c*, 522*d*, and 522*e*. Selection of check box control 522*a* defines parameters that switch overwrite values based on an elapsed time. In other words, selection of control 522*a* provides for switching of overwrite parameters at a periodic frequency specified by the user interface 520. When user interface 520 is displayed in response to selection of switching control 514*a*, periodic switching of SAP parameters are defined. When user interface 520 is displayed in response to selection of switching control 514*b*, periodic switching of network level parameter(s) are defined by the UI 520. When user interface 520 is displayed in response to selection of switching control 514*c*, periodic switching of link level parameter(s) are defined by the UI 520. The elapsed time between switches is defined via edit box 524*a*. For example, the edit box 524*a* is configured, in some embodiments, to receive data specifying an elapsed time in milliseconds, microseconds, seconds, or minutes. Thus, if in some embodiments, user interface 500 specifies switching of a source SAP parameter within a range (e.g. via 508*a-b*), and UI 520, upon selection of switch control 514*a*, defines switching based on time (via control 522*a*) with edit box 524*a* indicating an elapsed time of one second, then some of the disclosed embodiments will overwrite a source SAP field of outgoing messages with a different SAP every one second. In other words, a constant source SAP value will be used for a first elapsed time period specified by edit box 524*a* (e.g. one second), and then a different source SAP value will be used for the next defined time period (e.g. one second) after that, and so on.

Selection of check box 522*b* provides for switching of overwrite values based on an amount of data transmitted. The amount of data transmitted between switches is specified via edit box 524*b*. Thus, for example, in embodiments implementing this feature, a count of an amount of data transmitted is maintained. When the count transgresses a threshold defined by the edit box 524*b*, an overridden value is switched from a first value to a second value. The count is then reset and the process repeats.

The switching of overwritten values when check box 522*b* is selected operates in a similar manner as described above with respect to check box 522*a*, except the switch is caused by an amount of data transmitted between switching reaching a threshold amount specified by edit box 524*b*.

Selection of check box 522*c* provides for switching of overwrite values based on one or more criterion being met. The one or more criterion is specified via edit box 524*c*. The switching of overwrite values when check box 522*c* is selected operates in a similar manner as described above with respect to check box 522*a*, except the switch is caused by the criterion specified by edit box 524*c* being met. In some embodiments, the switching based on time and/or amount of data as described above may also be accomplished via criterion specified in the edit box 524*c*. The criterion may relate to values of data transmitted or any other data accessible to a device implementing disclosed embodiments In some aspects, a regular expression can be provided in the edit box 524*c* to define criterion that trigger a switch of overwrite parameter values.

Selection of checkbox control 522*d* provides for switching overwrite values based on reception of a software signal. Example user interface 520 shows that a signal identifier is provided in some embodiments via box 524*c*. For example, POSIX type signals may be used to trigger a switch of overwrite values in some embodiments. Otherwise, switching via signals via checkbox control 522*d* operates in a similar manner as other methods of switching described above.

Selection of checkbox control 522*e* provides for switching overwrite values based on reception of a hardware-based signal. For example, as discussed above with respect to FIG. 1, some embodiments provide for one or more hardware ports that may receive a signal from an external device, such as an FPGA or other hardware. Example user interface 520 provides an ability to specify a hardware port identifier via edit box 524*e*.

Figure 6:
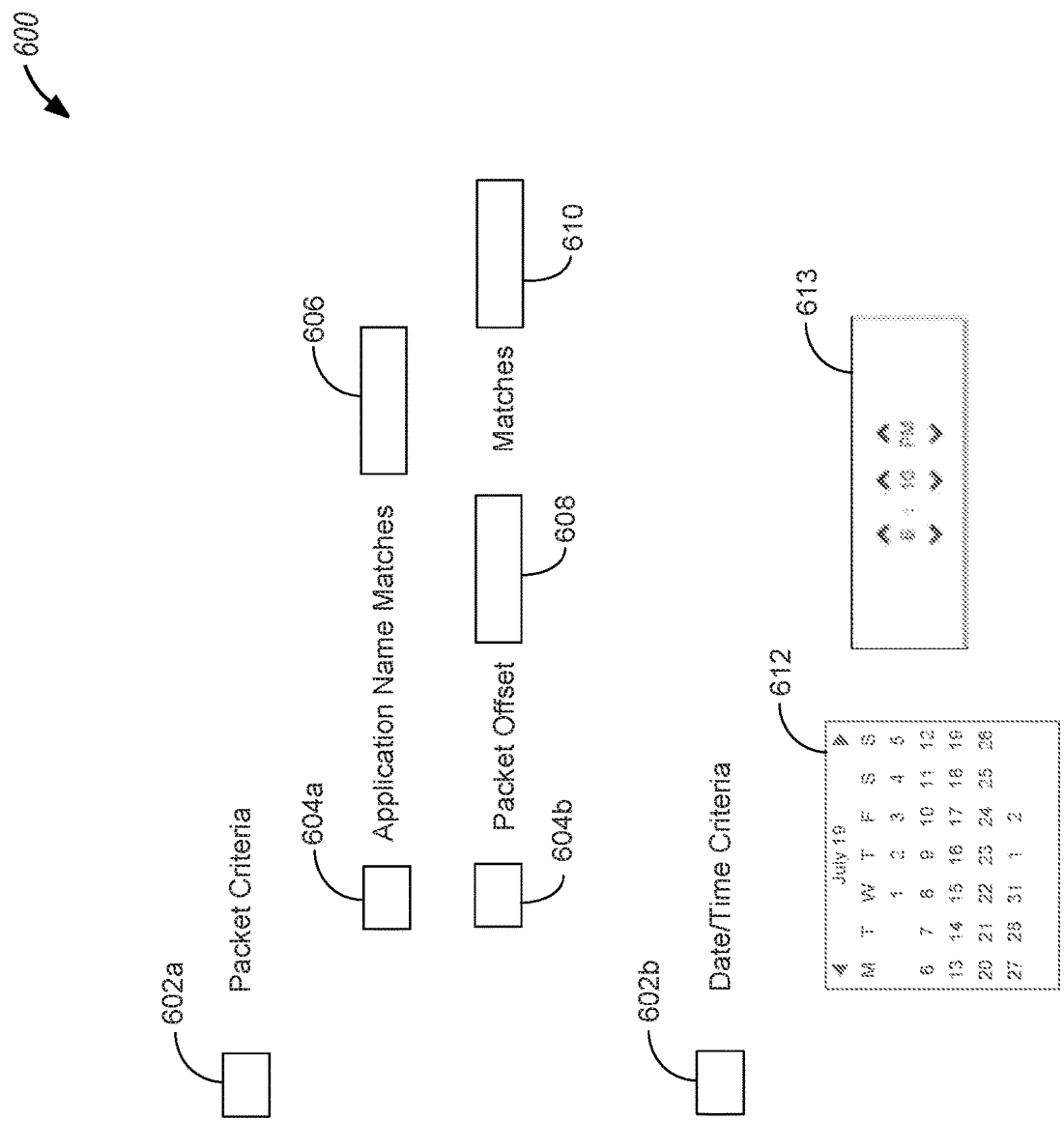
FIG. 6 shows an example user interface that may be implemented by one or more of the disclosed embodiments.

FIG. 6 shows an example user interface 600 that may be implemented by one or more of the disclosed embodiments. The user interface 600 defines criteria that when satisfied, provide for overwriting of network parameters as discussed above. For example, when criteria specified by the UI 600 are met, the disclosed embodiments may overwrite one or more of the source SAP, source network address, and/or source link address.

UI 600 provides for packet-based criteria (via check box 602a) and time/date-based criteria (via check box 602b). The packet-based criteria may provide for comparisons of a name of a process or application generating the packet via check box 604a. The comparison of the application name or process is performed against a string or regular expression (specified in edit box 606). The packet-based criteria also provide for a comparison at a particular offset within the packet via check box 604b. An offset within the packet for the comparison is specified via edit box 608. A value to compare against the packet value found at the offset is specified via edit box 610.

Time/date-based criteria may be specified via selection of check box 602b. UI 600 includes a calendar control 612 that provides for specifying a date range of when the criteria is met. Additional embodiments may provide for specifying a time of day range when the criteria are met, for example, via time picker control 612 shown in FIG. 6. The time of day/date range criterion may be in addition to, or in alternative to, the packet criterion in various embodiments.

Figure 7:
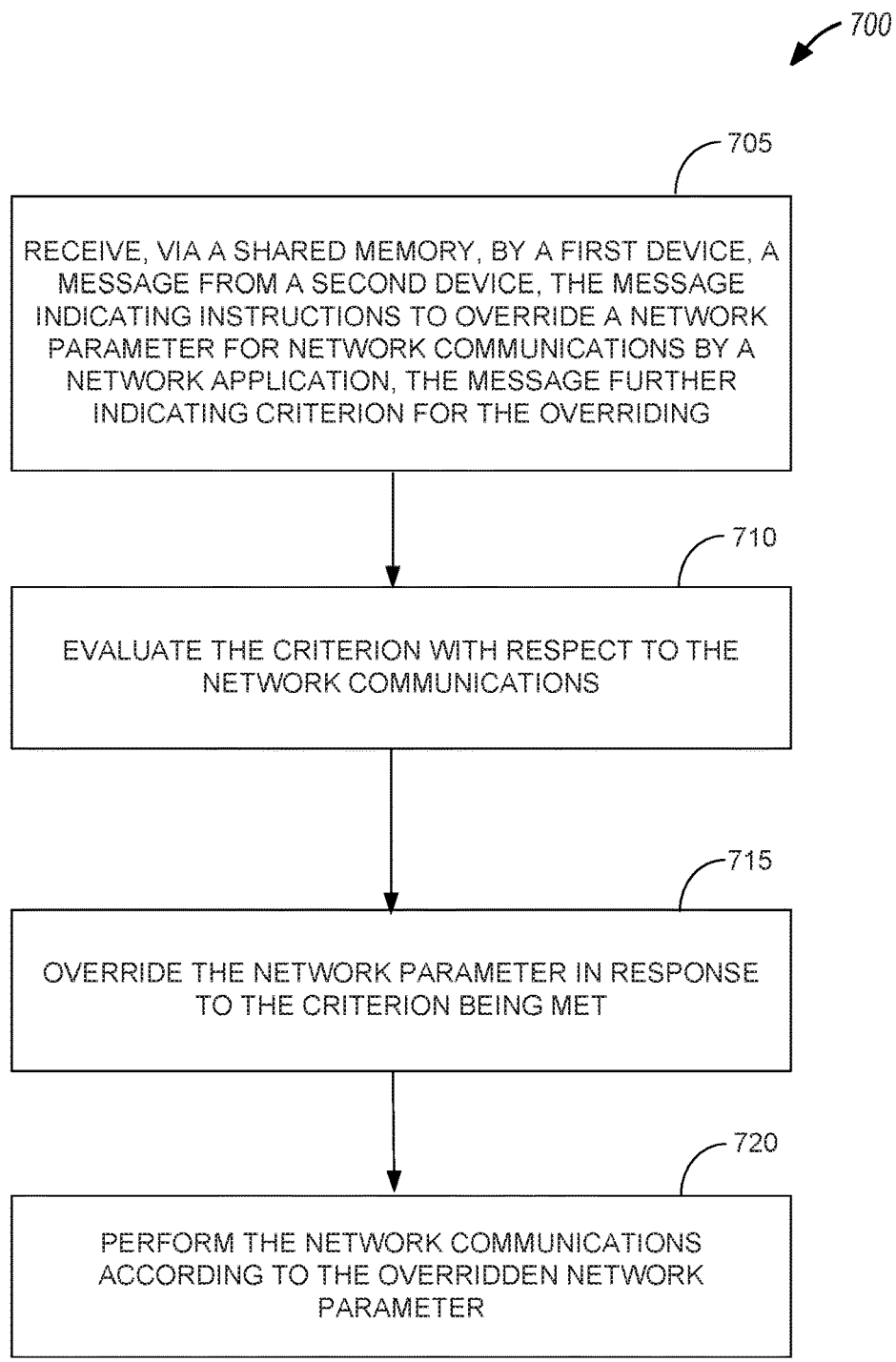
FIG. 7 is a flowchart of a process for overriding a network parameter.

FIG. 7 is a flowchart of a process for overriding a network parameter. In some aspects, one or more of the functions discussed below with respect to FIG. 7 may be performed by a source device (e.g., any of 102a-c), or by instructions stored in the control channel manager 202, discussed above with respect to FIG. 2. In some aspects, one or more of the functions discussed below with respect to FIG. 7 and process 700 are performed by hardware processing circuitry (e.g., processor 902 discussed below). In some of these aspects, instructions (e.g., instructions 924 discussed below) stored in a memory (e.g., memory 904 discussed below) configure the hardware processing circuitry to perform one or more of the functions discussed below with respect to FIG. 7 and process 700.

In operation 705, a message is received by a first device. In some aspects, the first device is a source device (e.g., any of 102a-c). The message may be received via a shared memory, such as the shared memory 105 discussed above with respect to FIG. 1. In some aspects, receiving a message may include polling a mailbox to detect a message is available in the mailbox. For example, in some aspects, a source device (e.g., any of 102a-c) may poll a mailbox (e.g., any of 106a-c) to identify when a message is available (e.g., via message availability indicator 302). In some aspects, a communications interface of a device performing process 700 may receive an interrupt when a message is made available in the mailbox. In these aspects, operation 705 may be performed in response to receiving such an interrupt. In some aspects, the message received in operation 705 may include one or more of the fields of the example message 500 discussed above with respect to FIG. 4.

For example, in some embodiments, the message includes an identifier that is predetermined to identify a particular network parameter. The network parameter includes one or more of a transport-level source port number, a source network address (e.g., IP address), or a link level address (e.g., an Ethernet station address). The message also includes a value to use to override the identified network parameter. In some embodiments, the message includes one or more criterion (e.g., criteria) that must be met before the specified network parameter is overridden. The one or more criterion may relate to conditions of a network communication subject to an override. For example, the criterion may evaluate whether a network communication is destined to a particular device or a particular set of addresses (including a single address), a type of transmission of the network communication (e.g., is it unicast, multicast, or broadcast), a source port of the communication, a type of transport protocol used for the communication (e.g., TCP or UDP, etc.), a name of a network application generating the network communication, a number of network packets or network messages generated within a specified time period, a CPU utilization of the first device, or other conditions of the network communication.

In operation 710, the criterion is evaluated with respect to the network communication. For example, operation 710 may evaluate the criterion with respect to each network packet or network message generated by a network protocol stack (e.g., 203) of the first device.

In operation 715, the specified network parameter is overridden in response to the one or more criterion being met. Overriding the network parameter may include intercepting a network packet or network message generated by the first device, and modifying the network parameter included in the network message or network packet in accordance with the instructions received in operation 705. For example, as discussed above, various network parameters included in a network packet or network message generated by the first device may have an initial or "default" value. These default values may result from nominal operation of the source device. As one example, the first device may be assigned a source network address, such as an IP address. In some embodiments, this source network address is stored in configuration data on the source device and is used by default for network messages and/or packets generated by the first device. The configuration data may be set by a network administrator, for example, via a configuration user interface or via a configuration file. In some cases, a source IP address may be assigned to the first device by a configuration protocol, such as the dynamic host configuration protocol (DHCP). In some embodiments, the network parameter (such as a source network address) may be specified by a network application (e.g., 204a via control API path 208a and sockets API/library 204b).

The message received via the shared memory in operation 705 may specify an alternate source network address that is used to override the default source network address provided via one of the default methods described above. Operation 715 operates similarly for other types of network parameters, such as transport level source ports (e.g., UDP source port) or link level addresses (e.g., an Ethernet station address). These network parameters also have default values that result from nominal operation of the source device (e.g., any of 102a-c) and/or network protocol stack (e.g., 203). These default values may be specified by the network application (e.g., 204a via control path 208a), or via configuration parameters. These default values may be similarly overridden by instructions received from the shared memory (e.g., shared memory 105).

In operation 720, the network communication is performed according to the overridden network parameter. In some aspects, operation 720 includes configuring the first device to transmit the intercepted network message and/or network packet that includes the overridden parameter value.

In some aspects of process 700, an evaluation of one or more second criterion received in a second message from the shared memory indicates that the second one or more criterion are not met for one or more network messages and/or network packets. In this case, process 700 inhibits any overriding of network parameters associated with the second criterion and allows those network messages and/or packets to be nominally transmitted by the first device.

Figure 8A:
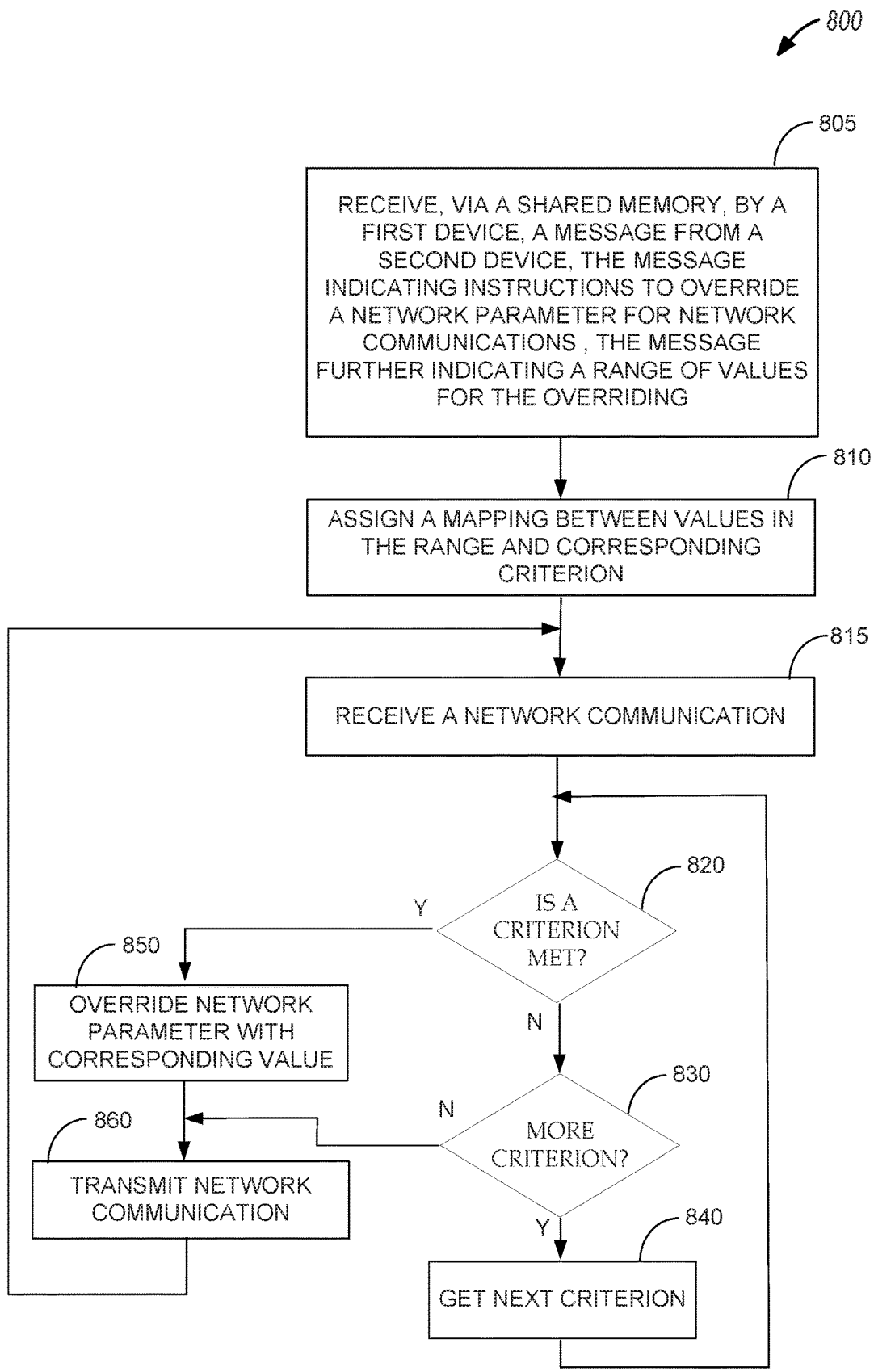
FIG. 8A is a flowchart of an example method that may be implemented in one or more of the disclosed embodiments.

FIG. 8A is a flowchart of an example method that may be implemented in one or more of the disclosed embodiments. In some embodiments, one or more of the functions discussed below with respect to FIG. 8A are performed by hardware processing circuitry (e.g., 902 discussed below). In some of these embodiments, one or more electronic hardware memories (e.g., 904 discussed below) stores instructions (e.g., 924 discussed below) that when executed, configure the hardware processing circuitry to perform the one or more functions of process 800 discussed below. In some embodiments, the first device described below with respect to FIG. 8A is a device executing the alternate channel controller 108 (e.g. controller device 107). In some of these aspects, the second device discussed below is a source node or source device (e.g. any of 102a-c).

In operation 805, instructions are received from a shared memory. The instructions are included in a message that is received by a first device from a second device via the shared memory (e.g., 105). The first device may, in some embodiments, be any one of the source devices 102a-c discussed above with respect to FIGS. 1 and/or 2. The second device in some embodiments rune the alternate channel controller 108 discussed above with respect to FIG. 1. The second device writes one or more messages to the shared memory (e.g., 105) instructing the first device (e.g., a source node 102a-c) to override one or more network parameters, as discussed above. In some embodiments, the shared memory is organized as described above with respect to FIG. 3. In some embodiments, one or more messages passed from the second device to the first device via the shared memory substantially conform, or include one or more of the data items discussed above with respect to FIG. 4.

In the embodiment described by FIG. 8A, the second device passes a network parameter range to the first device. The network parameter range indicates a range of network parameter values the first device is to use when overriding the network parameter specified in the message (e.g., via a predetermined value, indicating a network parameter such as a transport level source SAP (e.g., UDP SAP), source network address (e.g., IP address), or source station address (e.g., Ethernet address)). The instructions indicate the first device is to override a particular network parameter using values selected from the range. In some embodiments, the values within the range may be randomly selected by the first device when overriding the network parameter. In some other embodiments, the values may be sequentially selected (with a return to a lowest ordered value after the highest value selected value is selected).

In operation 810, a mapping between values within the range and separate one or more criterion is determined or assigned. In some aspects, the mapping is included or otherwise indicated in the message received from the shared memory. In some aspects, the first device determines the mapping. The one or more criterion for each value identifies a particular type of network message or packet to which the network parameter value is to be applied. For example, in some aspects, different criterion may identify different network applications. In these aspects, different network parameter values are then applied to network messages or packets generated by different network applications. In some other aspects, different criterion may identify network messages or network packets using different transport level protocols. For example, in some aspects, TCP messages may be overridden with a first value for a source network address or source link level address, while UDP messages are overridden with a second value for a source network address or source link level address. In some other aspects, the criterion may identify different source ports. Then different override values may be applied to network messages or packets having the different source ports. Any of these examples may also be combined such that the one or more criterion evaluates multiple conditions for each network message or network packet before determining a network parameter override value. In some aspects, the criterion may be structured such that process 800 performs time division multiplexing across multiple different source network addresses or source link level addresses. In these embodiments, a single source device (e.g., any of 102a-c) may appear on the network to be 10, 20, 50, or even 100 different devices (based on the use of different link level and/or network level source addresses).

In operation 815, a network communication is received. The network communication is generated by a network application executing on the first device (e.g., 204a). The network communication may be a network message or a network packet. The network message or packet may be sent by the network application via a data path (e.g., 208b) of a network protocol stack (e.g., 203). In some aspects, the network communication is received in operation 815 by intercepting a data path between two components of the protocol stack. For example, the network communication may be intercepted at any of data paths 208b, 210b, 212b, 214b, 216b.

In decision operation 820, a criterion is evaluated against the network communication (e.g., network message and/or network packet). The criterion is one of the criteria included in the mapping of operation 810. If the criterion as applied to the network communication is not met, process 800 moves from decision operation 820 to decision operation 830, which determines if there are additional criterion to evaluate. If there are no further criterion to evaluate, process 800 moves from decision operation 830 to operation 860, which transmits the network communication. Transmitting the network communication may include passing the network communication to a level of a network protocol stack below where the network communication was intercepted. For example, in embodiments intercepting the network communication at data path 212b, between the transport protocol 204 and the network protocol 204d, then operation 860 includes passing the network communication to the network layer 204d. After the network communication is transmitted in operation 860, processing returns to operation 815 where another network communication is received and processing repeats.

Returning to the discussion of decision operation 830, if there were more criterion to evaluate, process 800 moves from decision operation 830 to operation 840, which obtains the next criterion. The next criterion may be identified from the mapping of operation 810 in some aspects. Processing then returns to decision operation 820, which evaluates the next criterion.

Returning to the discussion of decision operation 820, if a criterion is met, process 800 moves to operation 850. Operation 850 determines a network parameter value mapped to the met criterion of decision operation 820. The parameter value is identified per mapping of operation 810. The network parameter value is then applied to the network communication by overriding the network parameter with the corresponding value.

Figure 8B:
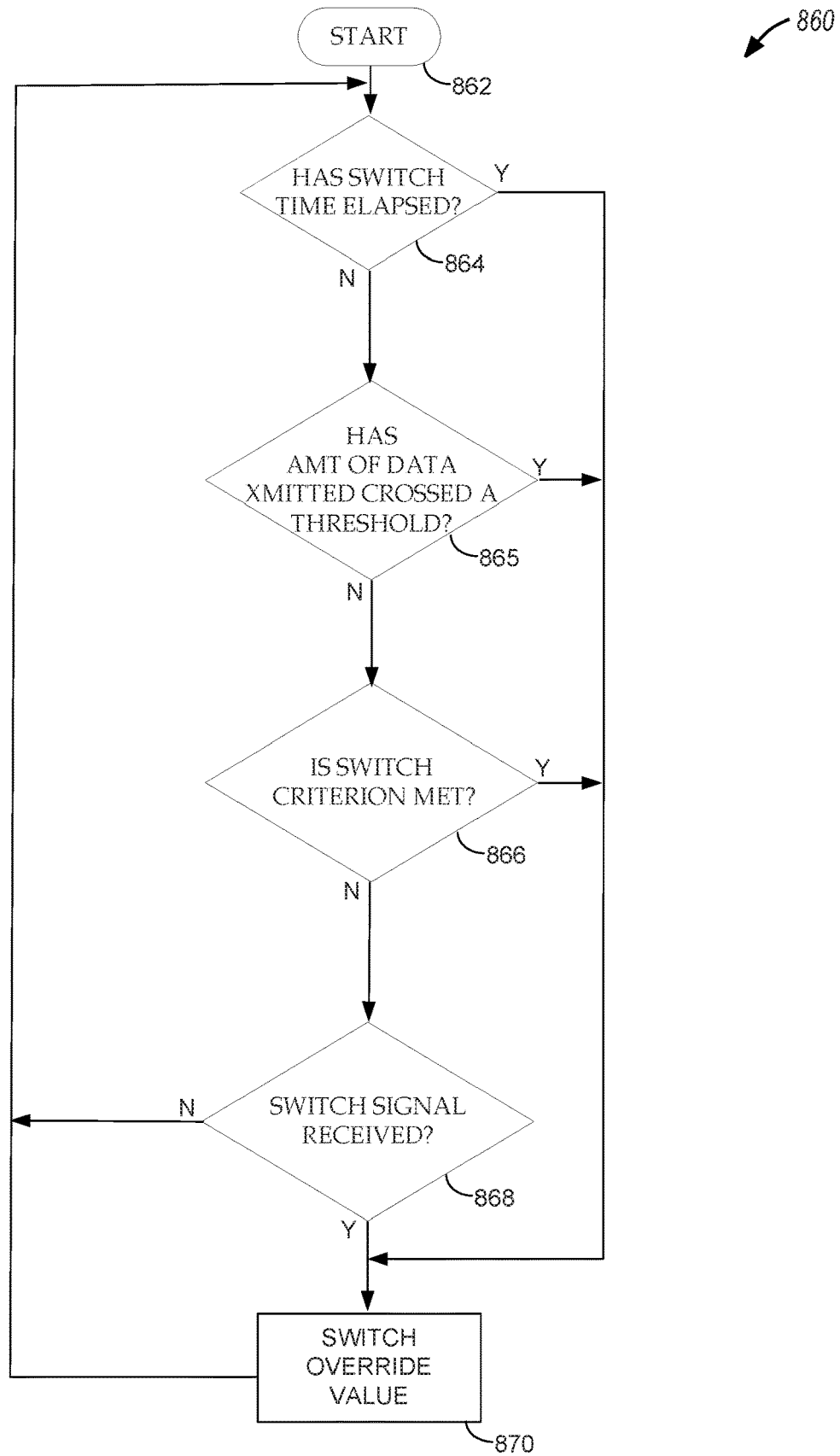
FIG. 8B is a flowchart of an example method that may be implemented in one or more of the disclosed embodiments.

FIG. 8B is a flowchart of an example method that may be implemented in one or more of the disclosed embodiments.

In some embodiments, one or more of the functions discussed below with respect to FIG. 8B are performed by hardware processing circuitry (e.g., 902 discussed below). In some of these embodiments, one or more electronic hardware memories (e.g., 904 discussed below) stores instructions (e.g., 924 discussed below) that when executed, configure the hardware processing circuitry to perform the one or more functions of process 800 discussed below. In some embodiments, the first device described below with respect to FIG. 8B is a device executing the control channel manager 202 (e.g. any of source nodes 102a-c) In some of these aspects, the second device discussed below is the controller device 107 running the alternate cannel controller 108.

After start operation 862, process 860 moves to decision block 864 which determines whether a switch time has elapsed. For example, decision block 864 may consider parameters set via user interface 520, such as check box 522a and/or edit box 524a. In some embodiments, decision operation 862 first considers whether switching via elapsed time is enabled or not (e.g. via check box 522a in some embodiments). If switching via elapsed time is enabled, some embodiments then compare an elapsed time since a previous switch to a threshold amount of time (e.g. indicated by edit box 524a in some embodiments). If the elapsed time has elapsed, process 860 moves from decision operation 864 to operation 870, discussed below. If the elapsed time has not elapsed, or switching based on elapsed time is not enabled, process 860 moves to decision operation 865

Decision operation 865 evaluates whether an amount of data transmitted has reached or otherwise transgressed a data threshold. In some embodiments, decision operation 865 first determines whether switching based on an amount of data is enabled (e.g. via UI checkbox 522 in some embodiments). If switching based on data amount is enabled, then an amount of data transmitted since a previous switch or initial overwrite of a parameter has reached a data threshold (e.g. such as a data threshold specified via 524b in some embodiments). If the amount of data transmitted has reached or transgressed the data threshold, then decision operation 865 moves to operation 870, discussed below. Otherwise, process 860 moves from decision operation 865 to operation 866.

Decision operation 866 evaluates whether one or more switching criterion is met. For example, as discussed above with respect to UI 520, switching criterion may be specified, for example, via a regular expression which is applied to data to be transmitted (e.g. via edit box 524c in some embodiments). If the one or more criterion is met, process 860 moves from decision operation 866 to operation 870, discussed below. Otherwise, process 860 moves from decision operation 866 to decision operation 868, which determines whether a signal has been received that indicates a switch in an overwrite parameter. For example, as discussed above with respect to UI 520, some embodiments provide for specification of one or more of a software generated signal (such as a POSIX signal) (e.g. via selection of check box 522d and specification of a specific signal via edit box 524c in some embodiments). Some embodiments provide for specification/configuration of a hardware signal, such as a signal received over a particular hardware port (e.g. via selection of checkbox 522e and/or specification of a port identification via edit box 524d in some embodiments). If a specified/configured signal has been received, process 860 moves from decision operation 868 to operation 870. Otherwise, process 860 moves from decision operation 868 back to operation 865 and process 860 may iterate.

Operation 870 then switches an overwrite value. For example, the overwrite value may be for any of the parameters discussed above, such as source/destination SAPs, source/destination network addresses, source/destination link level addresses, or any other network parameter. Switching switches from a first value to a second value. The switch performed in operation 870 is, in some embodiments, in conformance with a overwrite value selection methods specified for the network parameter. For example, as discussed above with respect to UI 500, an overwrite operation may be specified to use a random value or to select a value from a range of values. Thus, operation 870 switches from a first value to a second value consistent with the configured/specified method. Thus, if random determination of an overwrite value has been configured/specified (e.g. via 506a), then operation 870 generates a new random value and uses the new random value as the second value. If selection from a range has been configured/specified (e.g. via 506b), then operation 870 selects a new value from the identified range and uses that value as the second value. In some aspects, when a range of values has been configured/specified, operation 870 iterates through the range sequentially. In other embodiments, operation 870 selects a random value from the range, but ensures the same value is not used twice until all values have been used within at least a switching cycle.

Note that process 860 may operate for each overwritten network parameter. Thus, in the example UI of FIG. 5, process 860 may operate for each of an overwritten link address, network address, and/or SAP.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured to perform certain operations (e.g., as a special-purpose processor, such as a field programmable gate array (FPGA) or an application-specific integrated circuit (ASIC)). A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)). In some embodiments, the one or more processors may operate to support performance of disclosed embodiments in a real-time timing constrained system. For example, a group of computers with deterministic timing may be used to implement one or more of the disclosed embodiments.

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry (e.g., a FPGA or an ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 9:
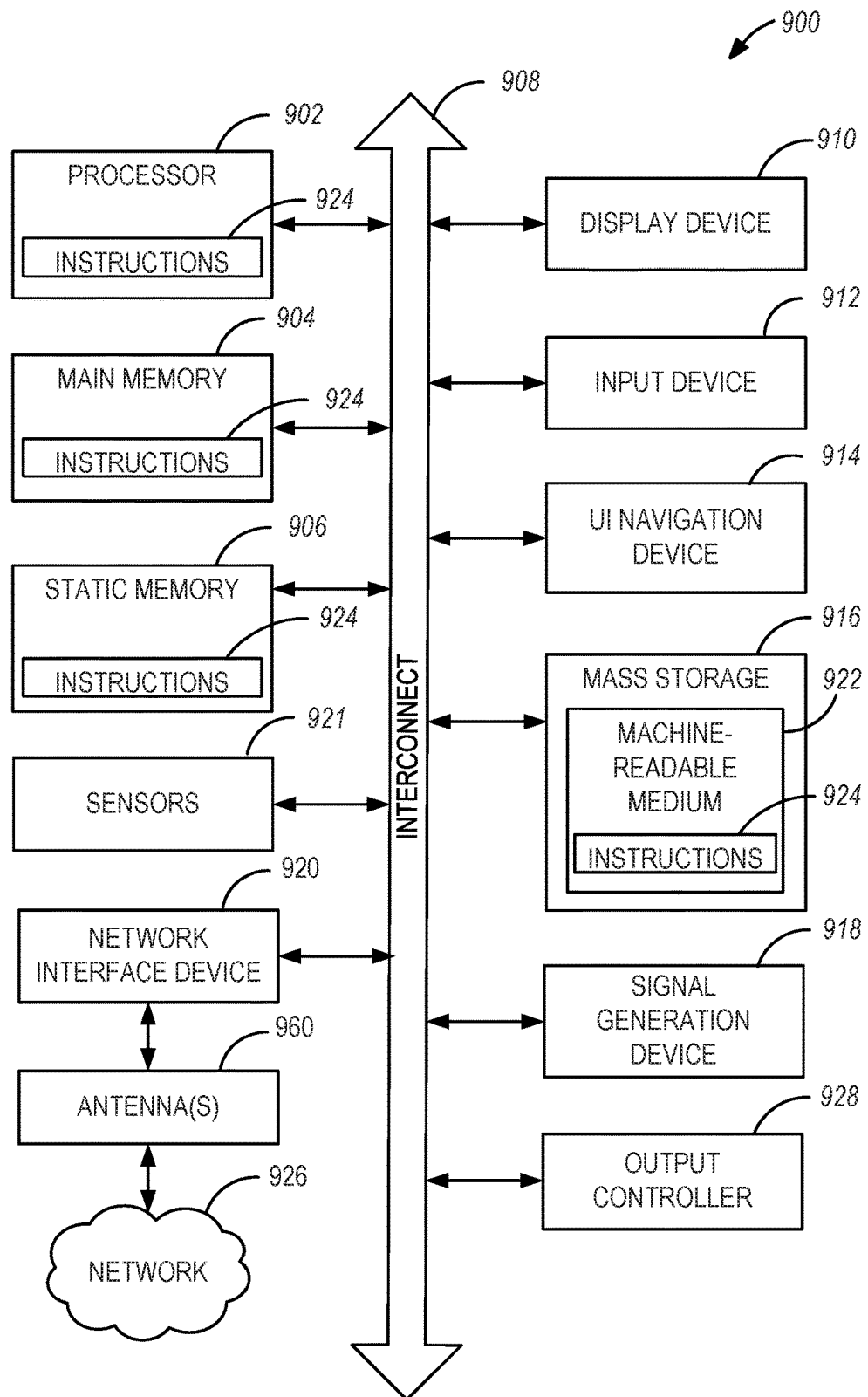
FIG. 9 illustrates, by way of example, a block diagram of an embodiment of a processing system on which one or more of the processes discussed herein, can be implemented.

FIG. 9 illustrates, by way of example, a block diagram of an embodiment of a processing system 900 on which one or more of the processes discussed herein, can be implemented. In these embodiments, any one of the source nodes 102*a-c* may be implemented by the system 900. In these embodiments, a non-transitory computer-readable storage medium 922 may be configured to store instructions 924 for execution by processing circuitry 902 of a source node 102 (FIG. 1) to communicate with a target node 104.

In some embodiments, the system 900 may also include one or more sensors 921, such as a global positioning system (GPS) sensor, a compass, and/or an accelerometer. In some embodiments, the system 900 may include an output controller 928, such as a serial (e.g., universal serial bus (USB)), a parallel, or other wired or wireless (e.g., infrared (IR), near field communication (NFC), etc.) controller.

In alternative embodiments, the system 900 operates as a standalone device or may be connected (e.g., networked) to other machines. In a networked deployment, the machine may operate in the capacity of a server or as a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example processing system 900 includes a processor or processing circuitry 902 (e.g., a central processing unit (CPU), a graphics processing unit (GPU) or both), a main memory 904 and a static memory 906, which communicate with each other and other system components via a bus 908. The processing system 900 may further include a video display unit 910 (e.g., a liquid crystal display (LCD) or a cathode ray tube (CRT)). The processing system 900 also includes an alphanumeric input device 912 (e.g., a keyboard), a user interface (UI) navigation device 914 (e.g., a mouse), a mass storage unit 916, a signal generation device 918 (e.g., a speaker), a network interface device 920, and radios or antennas 960 such as Bluetooth, WWAN, WLAN, and NFC, permitting the application of security controls on such protocols.

The mass storage unit 916 includes the machine-readable medium 922 on which is stored the one or more sets of instructions and data structures (e.g., software) 924 described above and embodying or utilized by any one or more of the methodologies or functions described herein. The instructions 924 may also reside, completely or at least partially, within the main memory 904, the static memory 906, and/or within the processor 902 during execution thereof by the processing system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, WLAN, LTE and 5G networks). The term "transmission medium" shall be taken to include any tangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Example 1 is a communication device configured to operate as a source node to transmit data to a target node, the communication device comprising: a memory, the memory configured for access by the communication device and a second device; processing circuitry configured to perform network communications on behalf of a network application executing on the communication device, the network communications configured, via one or more network parameters, for transmission to a target node, and the processing circuitry further configured to: receive a message from the second device via the memory, the message indicating instructions for overriding a network parameter of the network parameters, the instructions further indicating a criterion; determine the criterion is met by a particular network communication of the network communications; override the network parameter of the particular network communication with an override value indicated in the message in response to the criterion being met; and transmit the particular network communication including the overridden network parameter to the target node.

In Example 2, the subject matter of Example 1 optionally includes the processing circuitry further configured to: decode the message to identify an instruction to overwrite a transport level service access point (SAP) source port number with a first value; and override the transport level SAP source port number of the particular network communication with the first value in response to the criterion being met.

In Example 3, the subject matter of Example 2 optionally includes wherein the transport level service SAP source port number is a universal datagram protocol (UDP) source port number.

In Example 4, the subject matter of any one or more of Examples 2-3 optionally include the processing circuitry further configured to specify, via a network application, the transport level SAP source port number.

In Example 5, the subject matter of any one or more of Examples 1-4 optionally include the processing circuitry further configured to: decode the message to identify an instruction to override a link level address of the network communications with an address selected from an indicated link level address range; select an address from the link level address range; and override the link level address of the particular network communication with the selected address.

In Example 6, the subject matter of Example 5 optionally includes the processing circuitry further configured to: assign a plurality of link level addresses from the link level address range to a corresponding plurality of network application source ports; and perform time division multiplexing by transmitting packets having the network application source ports via the corresponding assigned link level addresses.

In Example 7, the subject matter of any one or more of Examples 1-6 optionally include the processing circuitry further configured to periodically switch the override value to a different value.

In Example 8, the subject matter of any one or more of Examples 1-7 optionally include the processing circuitry further configured to switch the override value in response to an amount of data transmitting transgressing a data threshold.

In Example 9, the subject matter of any one or more of Examples 1-8 optionally include the processing circuitry further configured to: decode the message to identify an instruction to override a network level address of the network communications; and override a network level address of the particular network communication with the instructed network level address.

In Example 10, the subject matter of any one or more of Examples 8-9 optionally include wherein the network level address is an Internet Protocol (IP) address.

Example 11 is a method to transmit data to a target node, the method comprising: performing network communications on behalf of a network application executing on a communication device, the network communications configured, via one or more network parameters, for transmission to a target node; receiving a message from a device via a shared memory, the message indicating instructions for overriding a network parameter of the network parameters, the instructions further indicating a criterion; determining the criterion is met by a particular network communication of the network communications; overriding the network parameter of the particular network communication with an override value indicated in the message in response to the criterion being met; and transmitting the particular network communication including the overridden network parameter to the target node.

In Example 12, the subject matter of Example 11 optionally includes decoding the message to identify an instruction to overwrite a transport level service access point (SAP) source port number with a first value; and overriding the transport level SAP source port number of the particular network communication with the first value in response to the criterion being met.

In Example 13, the subject matter of Example 12 optionally includes wherein the transport level service SAP source port number is a universal datagram protocol (UDP) source port number.

In Example 14, the subject matter of any one or more of Examples 12-13 optionally include specifying, via the network application, the transport level SAP source port number.

In Example 15, the subject matter of any one or more of Examples 11-14 optionally include decoding the message to identify an instruction to override a link level address of the network communications with an address selected from an indicated link level address range; selecting an address from the link level address range; and overriding the link level address of the particular network communication with the selected address.

In Example 16, the subject matter of Example 15 optionally includes assigning a plurality of link level addresses from the link level address range to a corresponding plurality of network application source ports; and performing time division multiplexing by transmitting packets having the network application source ports via the corresponding assigned link level addresses.

In Example 17, the subject matter of any one or more of Examples 11-16 optionally include periodically switching the override value to a different value.

In Example 18, the subject matter of any one or more of Examples 11-17 optionally include The method Example 11, further comprising switching the override value in response to an amount of data transmitting transgressing a data threshold.

In Example 19, the subject matter of any one or more of Examples 11-18 optionally include decoding the message to identify an instruction to override a network level address of the network communications; and overriding a network level address of the particular network communication with the instructed network level address.

Example 20 is a non-transitory computer readable storage medium comprising instructions that when executed configured hardware processing circuitry to perform operations comprising: performing network communications on behalf of a network application executing on a communication device, the network communications configured, via one or more network parameters, for transmission to a target node; receiving a message from a device via a shared memory, the message indicating instructions for overriding a network parameter of the network parameters, the instructions further indicating a criterion; determining the criterion is met by a particular network communication of the network communications; overriding the network parameter of the particular network communication with an override value indicated in the message in response to the criterion being met; and transmitting the particular network communication including the overridden network parameter to the target node

What is claimed is:

1. A communication device configured to operate as a source node to transmit data to a target node, the communication device comprising:
    processing circuitry configured to perform network communications on behalf of a network application executing on the communication device, the network communications configured, via one or more network protocol stack control parameters, for transmission to the target node, and the processing circuitry further configured to:
    receive a message from a second device via a memory configured for access by the communication device and the second device, the message including an identifier of a network parameter of the one or more network protocol stack control parameters to override, a switch criterion field identifying a switch criterion of when to override the identified network parameter, and an override value for the identified network parameter;
    decode the switch criterion field and determine the switch criterion is met by a particular network communication of the network communications;
    override the identified network parameter of the particular network communication with the override value indicated in the message in response to the switch criterion of the message being met; and transmit the particular network communication including the overridden network parameter to the target node.

2. The communications device of claim 1, the processing circuitry further configured to:
decode the message to identify an instruction to overwrite a transport level service access point (SAP) source port number with a first value; and
override the transport level SAP source port number of the particular network communication with the first value in response to the switch criterion being met.

3. The communications device of claim 2, wherein the transport level SAP source port number is a universal datagram protocol (UDP) source port number.

4. The communications device of claim 2, the processing circuitry further configured to specify, via a network application, the transport level SAP source port number.

5. The communications device of claim 1, the processing circuitry further configured to:
decode the message to identify an instruction to override a link level address of the network communications with an address selected from an indicated link level address range;
select an address from the link level address range; and
override the link level address of the particular network communication with the selected address.

6. The communications device of claim 5, the processing circuitry further configured to:
assign a plurality of link level addresses from the link level address range to a corresponding plurality of network application source ports; and
perform time division multiplexing by transmitting packets having the network application source ports via the corresponding assigned link level addresses.

7. The communications device of claim 1, the processing circuitry further configured to periodically switch the override value to a different value.

8. The communications device of claim 1, the processing circuitry further configured to switch the network parameter with the override value in response to an amount of data transmitting transgressing a data threshold.

9. The communications device of claim 1, the processing circuitry further configured to:
decode the message to identify an instruction to override a network level address of the network communications; and
override a network level address of the particular network communication with the instructed network level address.

10. The communications device of claim 9, wherein the network level address is an Internet Protocol (IP) address.

11. A method to transmit data to a target node, the method comprising:
performing network communications on behalf of a network application executing on a communication device, the network communications configured, via one or more network protocol stack control parameters, for transmission to the target node;
receiving a message from a device via a shared memory, the message including an identifier of a network parameter of the one or more network protocol stack control parameters to override, a switch criterion field identifying a switch criterion of when to override the identified network parameter, and an override value for the identified network parameter;
decoding the switch criterion field and determining the switch criterion is met by a particular network communication of the network communications;
overriding the identified network parameter of the particular network communication with the override value indicated in the message in response to the switch criterion of the message being met; and
transmitting the particular network communication including the overridden network parameter to the target node.

12. The method of claim 11, further comprising:
decoding the message to identify an instruction to overwrite a transport level service access point (SAP) source port number with a first value; and
overriding the transport level SAP source port number of the particular network communication with the first value in response to the switch criterion being met.

13. The method of claim 12, wherein the transport level SAP source port number is a universal datagram protocol (UDP) source port number.

14. The method of claim 12, further comprising specifying, via the network application, the transport level SAP source port number.

15. The method of claim 11, further comprising:
decoding the message to identify an instruction to override a link level address of the network communications with an address selected from an indicated link level address range;
selecting an address from the link level address range; and
overriding the link level address of the particular network communication with the selected address.

16. The method of claim 15, further comprising:
assigning a plurality of link level addresses from the link level address range to a corresponding plurality of network application source ports; and
performing time division multiplexing by transmitting packets having the network application source ports via the corresponding assigned link level addresses.

17. The method of claim 11, further comprising periodically switching the override value to a different value.

18. The method claim 11, further comprising switching the override value in response to an amount of data transmitting transgressing a data threshold.

19. The method of claim 11, further comprising:
decoding the message to identify an instruction to override a network level address of the network communications; and
overriding a network level address of the particular network communication with the instructed network level address.

20. A non-transitory computer readable storage medium comprising instructions that when executed configured hardware processing circuitry to perform operations comprising:
performing network communications on behalf of a network application executing on a communication device, the network communications configured, via one or more network protocol stack control parameters, for transmission to a target node;
receiving a message from a device via a shared memory, the message including an identifier of a network parameter of the one or more network protocol stack control parameters to override, a switch criterion field identifying a switch criterion of when to override the identified network parameter, and an override value for the identified network parameter;
decoding the switch criterion field and determining the switch criterion is met by a particular network communication of the network communications;
overriding the identified network parameter of the particular network communication with the override value indicated in the message in response to the switching criterion of the message being met; and transmitting the particular network communication including the overridden network parameter to the target node.

\* \* \* \* \*